United States Patent [19]

Beyer

[11] Patent Number: 5,722,520
[45] Date of Patent: Mar. 3, 1998

[54] REACTION SURFACES FOR HYDRAULICALLY ACTUATED CLUTCHES

[75] Inventor: Charles E. Beyer, Clinton Township, Mich.

[73] Assignee: Meritor Heavy Vehicle Systems, LLC

[21] Appl. No.: 621,927

[22] Filed: Mar. 26, 1996

[51] Int. Cl.$^6$ .......................... F16D 25/08; F16D 67/04
[52] U.S. Cl. ................ 192/13 R; 192/85 C; 192/91 R; 192/98; 192/18 A
[58] Field of Search ........................ 192/85 C, 98, 192/110 B, 91 R, 13 R, 18 A

[56] References Cited

U.S. PATENT DOCUMENTS

| 4,428,471 | 1/1984 | Parker et al. | 192/85 C |
| 4,579,203 | 4/1986 | Link | 192/98 X |
| 4,991,702 | 2/1991 | Ladin | 192/85 C |
| 5,335,764 | 8/1994 | Leitner et al. | 192/85 C |

FOREIGN PATENT DOCUMENTS 1231290  5/1971  United Kingdom.

Primary Examiner—Richard M. Lorence

[57] ABSTRACT

A hydraulically actuated clutch includes a pair of hydraulic cylinders driving pistons to selectively move a clutch bearing to bring the clutch into and out of engagement. In standard clutches, a feature known as a clutch brake is sometimes contacted by the clutch bearing. The clutch bearing contacts the clutch brake to prevent rotation of the shaft under certain conditions. Because of this contact, the clutch bearing could rotate. Thus, anti-rotation structure is included in the inventive hydraulically actuated clutch. In a first embodiment, the anti-rotation structure includes surfaces formed on the sides of hydraulic cylinder housings which prevent rotation of the clutch bearing. The surfaces are preferably positioned radially inwardly from the pistons, and axially between the pistons and the clutch disks and plates which actually transmit the rotation through the clutch. In this way, the anti-rotation structure is optimally positioned to reliably prevent rotation. In a second embodiment, the anti-rotation structure includes a plurality of pins which prevent rotation of the clutch bearing.

22 Claims, 4 Drawing Sheets

REACTION SURFACES FOR HYDRAULICALLY ACTUATED CLUTCHES

BACKGROUND OF THE INVENTION

This invention relates to a hydraulically actuated clutch wherein the clutch bearing is prevented from rotating with the shaft.

In the prior art, clutches are typically mechanically actuated. Mechanically actuated clutches typically include a complex mechanical linkage wherein a number of parts move upon the actuation of the clutch pedal by the operator. The linkage moves the clutch into and out of engagement. With wear, and over time, the relative positions of the various mechanical linkages may change. Thus, frequent adjustment and maintenance is necessary. Moreover, given the wear and adjustment, mechanical linkages may not be as reliable as desired. Further, mechanical clutches have a relatively high friction load that increases the resistance at the operator pedal.

For that reason, hydraulically actuated clutches have been proposed. In the prior art, one hydraulically actuated clutch included a pair of hydraulic cylinders and pistons placed symmetrically about a center plane of the clutch. The hydraulic pistons contact and move the clutch bearing to connect or disconnect the clutch members as desired. The prior art system described above, wherein the hydraulic cylinders are symmetrically arranged, was a proposed system and is not a production system.

One real world feature that is ignored in the above-described proposed system is the existence of a clutch brake. A clutch brake is a member that rotates with the output shaft of the clutch, and is engaged by the clutch bearing under certain conditions. In first gear the clutch bearing may move for an extended amount relative to its typical movement, and engage the clutch brake. The purpose of this movement is such that the clutch bearing prevents rotation of the clutch brake and hence the shaft.

However, if the clutch brake and shaft are rotating when the clutch bearing initially contacts the two, there is the possibility that the clutch bearing would be driven to rotate with the clutch brake for a small amount of movement. In the above-described prior art hydraulically actuated clutches, the piston contact surface on the clutch bearing for the piston is a relatively small surface area. It would be undesirable to have rotation of the clutch bearing, as the reaction surface may then move out of alignment with the piston.

SUMMARY OF THE INVENTION

The disclosed embodiments of this invention all relate to various members which prevent rotation of the clutch bearing. Thus, when the clutch bearing contacts the clutch brake, it is prevented from rotating.

In one disclosed embodiment of this invention, the hydraulic cylinders house pistons which drive the clutch bearing between the connected and disconnected positions. Guiding or reaction surfaces are formed along the side of the hydraulic cylinder housings, and mating surfaces are formed on the clutch bearing. The hydraulic cylinders are placed at two symmetrically arranged opposed sides of the clutch bearing. Thus, the clutch bearing is prevented from rotating with the clutch brake by those surfaces. In a preferred embodiment, the reaction surfaces on the hydraulic cylinder housings and the clutch bearing are kept in close contact such that the surfaces also provide a guiding surface for clutch bearing movement.

The machined face of the transmission bell housing insures that the hydraulic cylinder housing is properly aligned with regard to the internal structure of the clutch. In addition, at least two bolts secure the shoulder to the transmission bell housing. The combination of these two features insures that the hydraulic cylinder housing is properly positioned within the transmission bell housing such that the axis of the piston is parallel to the axis of the clutch shaft.

In a preferred embodiment, the reaction surface is positioned radially inwardly from the location of the hydraulic cylinder piston. In further preferred features, the reaction surface is positioned axially between a piston contact surface on the clutch bearing which is contacted by the piston, and the clutch mechanism. That is, the portion of the clutch bearing which is being pushed by the piston is positioned axially outwardly of the reaction surfaces relative to the clutch members. The preferred positioning improves the operability and reliability of the inventive structures.

In a second embodiment, the anti-rotation structure includes pins which extend from the clutch bearing into a fixed structure. The pins may be received within the transmission bell housing, although other positions may also be utilized. The pins prevent the clutch bearing from rotating.

These and other features of the present invention will be best understood from the following specification and drawings, of which the following is a brief description.

DETAILED DESCRIPTION OF THE PREFERRED EMBODIMENT

Figure 1:
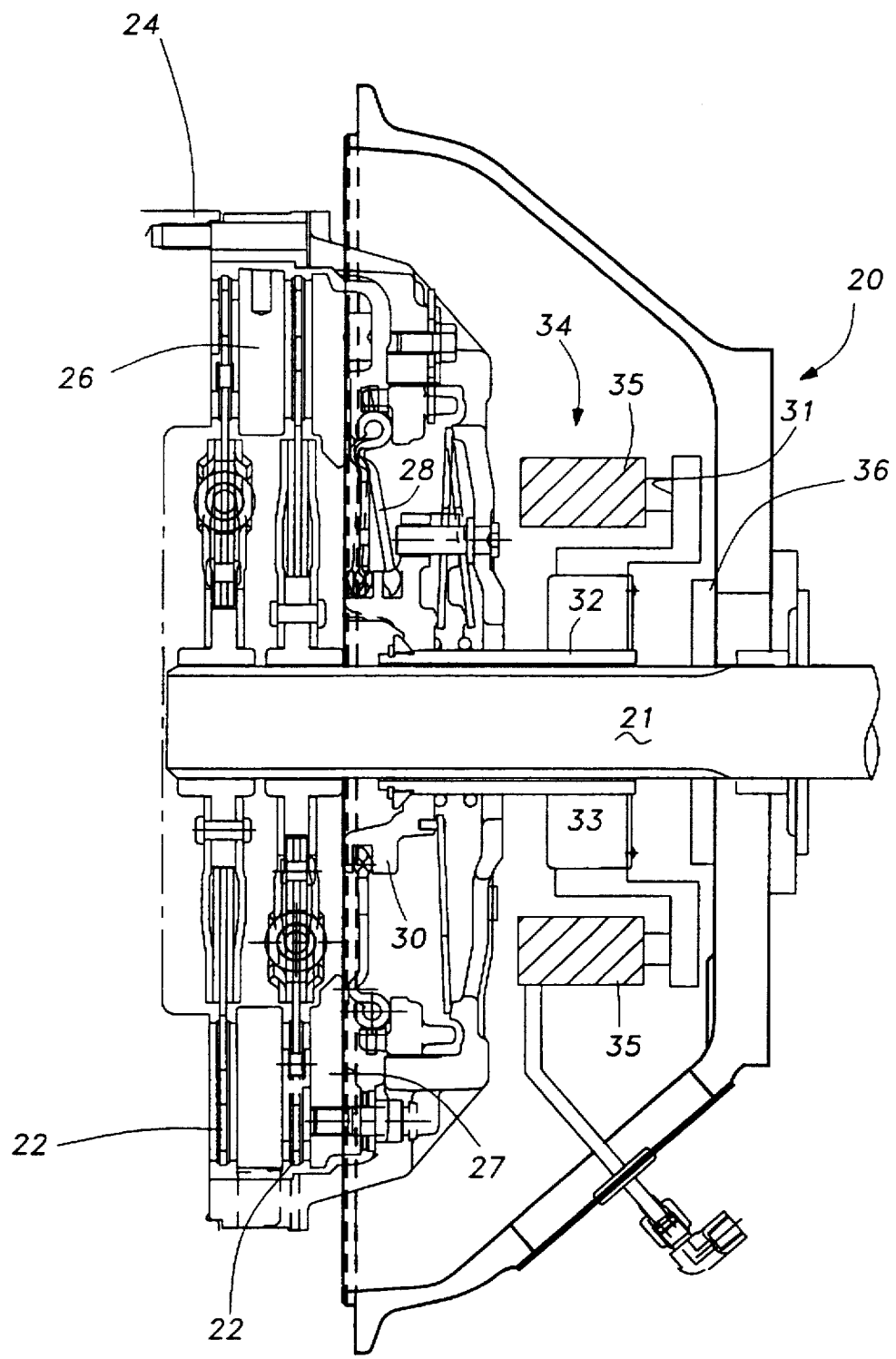
FIG. 1 is a schematic view showing a prior art clutch mechanism.

FIG. 1 shows a typical hydraulically actuated clutch 20. As is known, a shaft 21 is selectively driven through clutch 20. A pair of clutch disks 22 are fixed to rotate with shaft 20. A rotating clutch housing 24 is driven by the flywheel of the engine. An intermediate plate 26 is positioned between disks 22. A pusher plate 27 is selectively moved to connect or disconnect the clutch disks 22 to the housing 24 by a lever 28. Lever 28 is moved between the disconnect and connect positions by a sleeve 30, which moves with a tubular sleeve 32.

A mechanism 34 includes hydraulic cylinders 35 which move a clutch bearing 33 to move tubular sleeve 32 and lever 28 between the connect and disconnect positions. A clutch brake 36 is positioned rearwardly of the actuation mechanism 34, and is also fixed to rotate with shaft 20. In first gear, the clutch bearing will move a relatively large amount, and will contact the clutch brake 36 to prevent rotation of shaft 20. The structure of the clutch is well known in the art, and thus, the description in this application is relatively schematic.

Figure 2A:
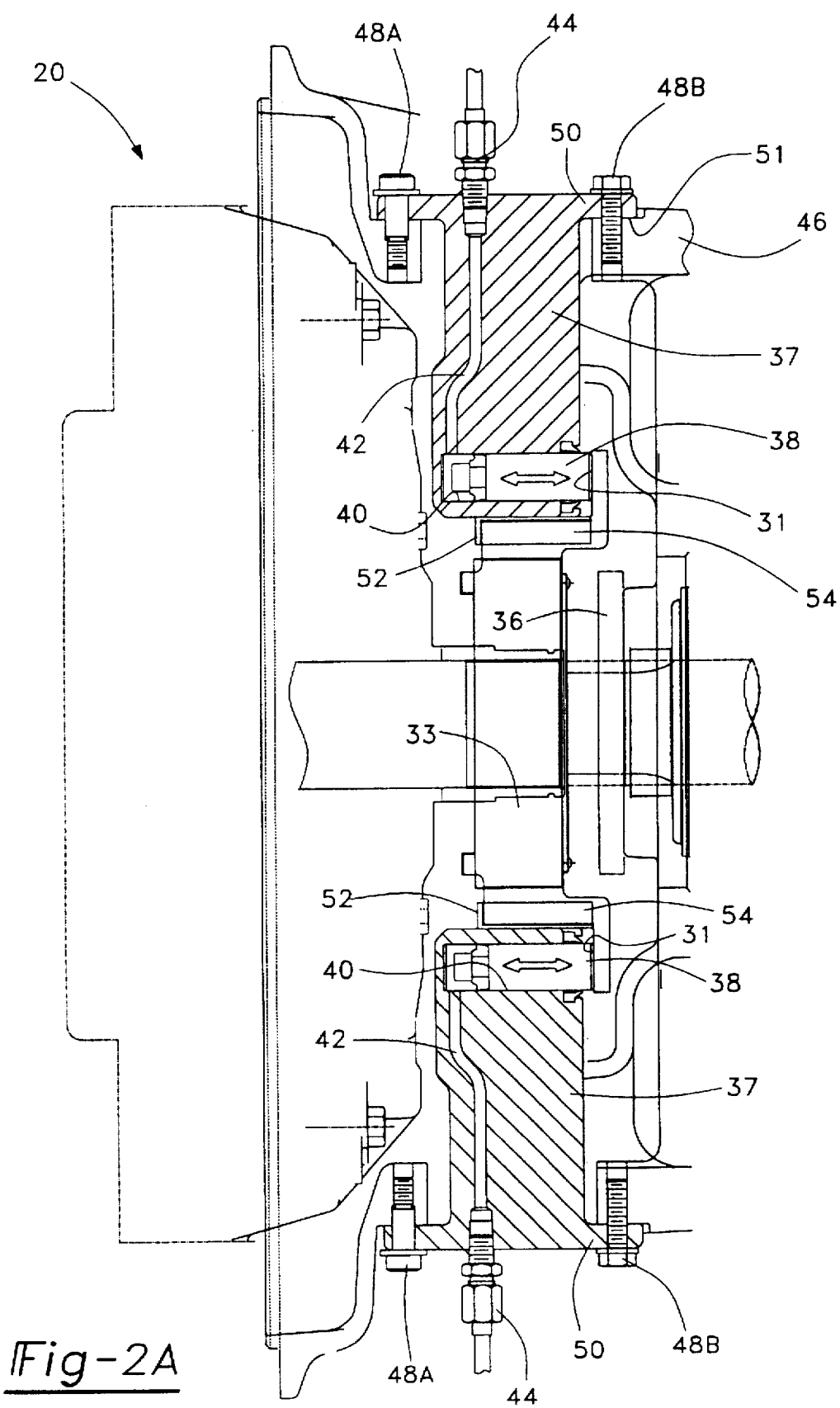
FIG. 2A is a cross-sectional view showing a first embodiment of the present invention.

As shown in FIG. 2A, the inventive and preferred actuation mechanism 34 includes a clutch bearing 33 having a piston contact surfaces 31 to be contacted by pistons 38 inside hydraulic cylinder housings 37. Pistons 38 are each housed within a machined piston bore 40 in a housing 37. A passage 42 is formed within housing 37 to an outer fluid connection 44. The outer transmission bell housing 46 has an opening into which is inserted the hydraulic cylinder housings 37. Bolts 48A and 48B secure a cylindrical flange 50 of housing 37 within a partially countersunk bore 51.

As is disclosed in more detail in co-pending patent application Ser. No. 08/621,928, entitled "Plug-In Hydraulic Cylinder Housing For Hydraulically Actuated Clutch," and fried on the same date as this application, the hydraulic cylinder housing 37 may simply be plugged into the outer housing 46, and the fluid connection 44 then made. Due to the simplified fluid connection through passage 42 and the machined piston bore 40, this connection is relatively simplified over the prior art connection of hydraulic cylinders into a clutch housing.

As described above, when a hydraulic cylinder and piston are utilized to move a clutch bearing 33, the clutch plate will occasionally come into contact with the clutch brake 36. Thus, an anti-rotation feature is incorporated into the invention. In one embodiment of this invention, the anti-rotation feature includes reaction or guiding surfaces 52 formed along the surface of a radially inner end of the hydraulic cylinder housing 37. A mating surface 54 on the clutch bearing rides along the surface 52. In a preferred embodiment, the surfaces actually ride along each other such that the reaction surface 52 also guides the surface 54 and hence the clutch bearing 33. Although guiding contact is beneficial, all that is necessary is that the surface 52 be at least closely spaced from the surface 54 such that rotation of the clutch bearing 35 is prevented. That is, due to the two opposed surfaces 52 on the two hydraulic cylinder housings 37, rotation of the clutch bearing 35 is prevented.

The reaction surfaces 52 and 54 are positioned radially inwardly of the position where the piston 38 contacts the piston contact surface 31, and also axially between surface 37 and the remainder of the clutch 20 (which is spaced to the left in this figure). The position of the guiding surfaces 52 and 54 relative to the pistons and clutch improves the reliability of rotation prevention and guiding of the surfaces.

Figure 2B:
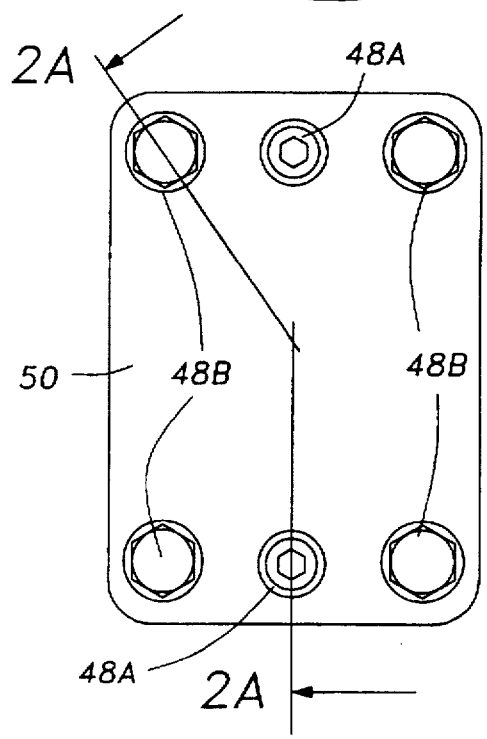
FIG. 2B is an outside view of the attachment structure for the hydraulic cylinder housing.

As shown in FIG. 2B, there are as many as six bolts securing the shoulder 50 to the housing 46. Shoulder bolts 48A include unthreaded dowel portions which are closely received within the holes drilled for the bolts 48A. The positioning of these bolts is such that a line drawn through the center of the holes for bolts 48A is parallel to the axis of the clutch shaft. In this way, by using the bolts 48A through the carefully formed holes, one insures that the hydraulic cylinder housing is properly aligned with regard to the central shaft axis. In addition, the other threaded bolts 48B further secure the hydraulic cylinder housing 37 to the transmission bell housing 46. The surface 51 is carefully machined such that when the shoulder 50 abuts the surface 51, the hydraulic cylinder housing 37 is properly positioned relative to the internal axes of the clutch. The combination of the bolts 48A, and the surface 51, insures that the axis of the piston bore 40 is parallel to the shaft axis of shaft 21. Other ways of properly positioning the cylindrical housing 37 relative to the clutch may be utilized. As an example, curved surfaces or other surfaces which insure proper position may be substituted for that which is disclosed in this application.

Figure 3:
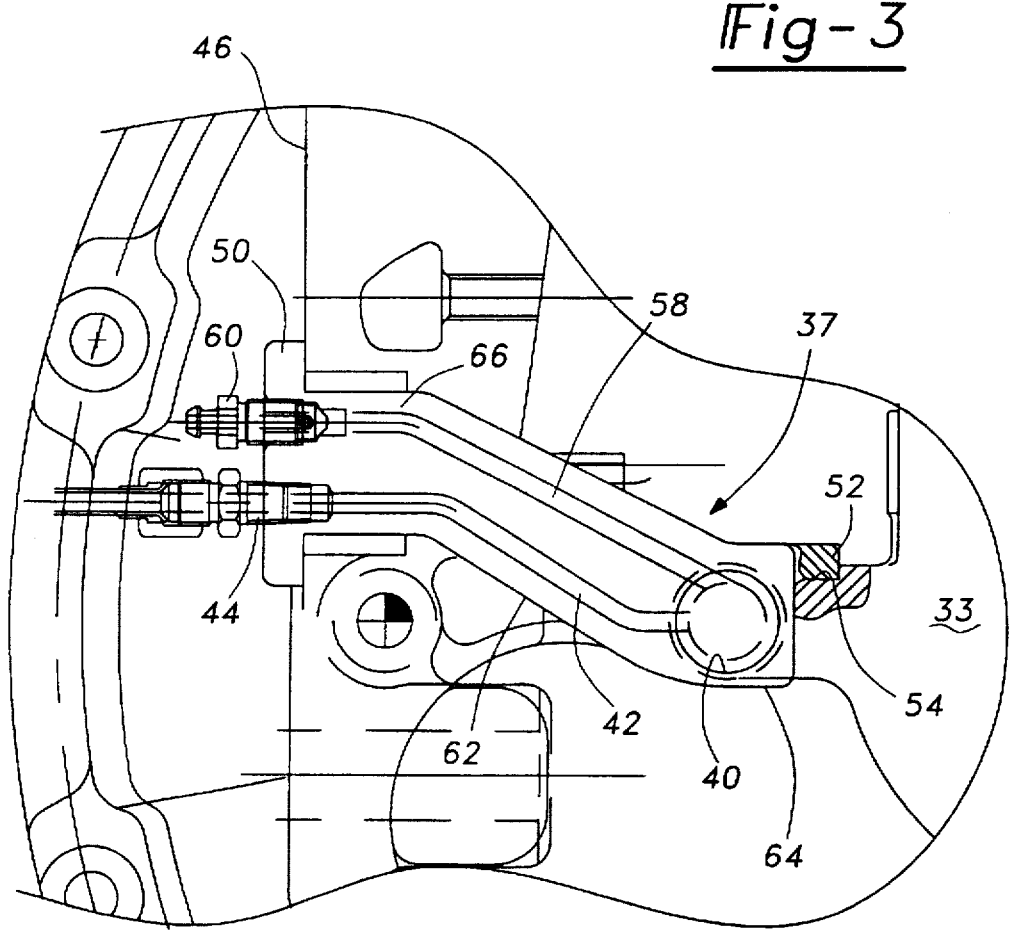
FIG. 3 is a partial view of a cross-section taking generally along line 3—3 as shown in FIG. 2.

As shown in FIG. 3, the cylinder housing 37 also includes a second vent passage 58, which vents any air from the piston cylinder 40 to a vent member 60. The hydraulic cylinder housing 37 includes a central portion 62 which is angled downwardly to an inner portion 64 which includes the guiding surface 52. An outer portion 66 associated with the flange 50 is utilized to attach the hydraulic cylinder housing 37 to the outer transmission bell housing 46.

Now, in operation, when the clutch bearing 33 moves under the influence of the pistons 38, the surfaces, 52 and 54 prevent any rotation. Should the clutch bearing 33 contact the clutch brake 36, the clutch beating 33 will not rotate due to the guiding surfaces. Instead, the clutch bearing will surely and quickly prevent rotation of the clutch brake 36 and hence the shaft 20.

Figure 4:
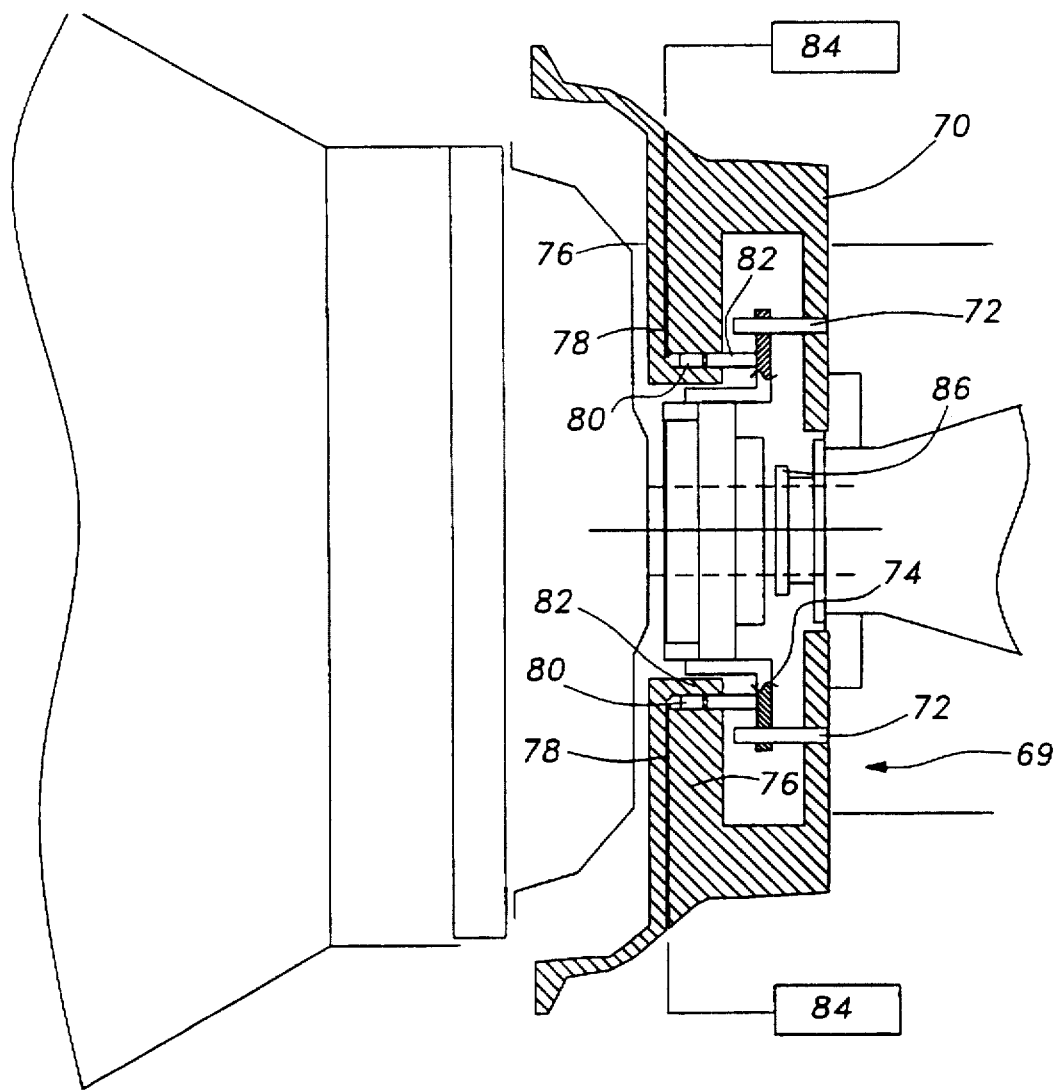
FIG. 4 is a partially schematic view of a second embodiment of the present invention.

FIG. 4 shows a second embodiment 69 of the present invention. Clutch housing 70 incorporates a pair of pins 72 received within holes in the clutch bearing 74. The pins could extend through notches in the clutch bearing 74, rather than through holes. This figure shows the invention somewhat schematically, however, the main functional features can be determined. The hydraulic cylinder housings are replaced by integral hydraulic cylinder housings 76 formed within the housing 70. Passages 78 communicate with a machined bore 80 receiving the pistons 82. A source of hydraulic fluid 84 communicates fluid to the passages 78 for actuation of the pistons 82. The clutch brake 86 is positioned rearwardly of the clutch bearing 74. The pins 72 prevent rotation of the clutch bearing 74 when it contacts the clutch brake 86.

One inventive feature shown in FIG. 4 is the integral hydraulic cylinder housing 76 formed within the cast housing. By utilizing such a structure, this feature of the invention eliminates the necessity of the separate hydraulic cylinder parts, and their separate attachment. This feature is separately inventive from the remainder of this invention.

Although it is preferred that the invention uses a hydraulic power fluid, other fluids such as air may be used. Although the invention is preferably a fluid-controlled unit, other means for moving the pistons, such as magnetic or electronic drives, may be within the scope of this invention.

Although preferred embodiments of the present invention have been disclosed, it should be understood that certain modifications will come within the scope of this invention. For that reason, the following claims should be studied to determine the true scope and content of this invention.

I claim:

1. A clutch comprising:
   at least one disk selectively brought into and out of contact with a plate member to selectively transmit rotation between said plate member and said disk;
   actuation structure for selectively bringing said plate and said disk into contact, said actuation structure including a clutch bearing which is axially moveable between contact and noncontact positions;
   at least two pistons, said pistons being operable to move said clutch bearing between said contact and noncontact positions; and
   an anti-rotation structure for preventing rotation of said clutch bearing.

2. A clutch as recited in claim 1 wherein said disk is mounted to rotate with a shaft, and said plate member is mounted to rotate with a source of rotation, a clutch brake positioned on said shaft, and said clutch bearing being selectively brought into contact with said clutch brake under certain conditions.

3. A clutch as recited in claim 2, wherein said pistons are mounted in fluid cylinder housings, and said anti-rotation structure includes surfaces formed along a side of each of said fluid cylinder housings, said clutch bearing having mating surfaces, said surfaces on said clutch bearing and said fluid cylinder housings preventing rotation of said clutch bearing.

4. A clutch as recited in claim 3, wherein said anti-rotation surfaces on said fluid cylinder housing and said clutch bearing generally extend along a plane extending axially along the direction of movement of said clutch bearing.

5. A clutch as recited in claim 4, wherein said reaction surfaces on said fluid cylinder housings also guide movement of said clutch beating.

6. A clutch as recited in claim 5, wherein said clutch bearing includes a central axis, said clutch bearing including piston contact surfaces at a first radial distance spaced from said axis, and said surfaces on said fluid cylinder housing and on said clutch bearing being spaced from said axis by a second radial distance smaller than said first radial distance.

7. A clutch as recited in claim 6, wherein said anti-rotation surfaces on said fluid cylinder housing and on said clutch bearing are positioned axially between said piston contact surface on said clutch plate and said disk.

8. A clutch as recited in claim 4, wherein said anti-rotation surfaces on said fluid cylinder housing and on said clutch bearing are positioned axially between the portion of said clutch bearing contacted by said pistons and said disk.

9. A clutch as recited in claim 3, wherein said fluid cylinder housings extend into a side wall of an outer housing, and are bolted to said outer housing.

10. A clutch as recited in claim 2, wherein said anti-rotation structure includes at least one pin received in said clutch bearing which prevent rotation of said clutch beating.

11. A clutch as recited in claim 10, wherein there are a pair of said pins.

12. A fluid clutch comprising:
at least one disk selectively brought into and out of contact with a plate member to selectively transmit rotation between said plate member and said disk;
actuation structure for selectively moving said plate and said disk into contact, said actuation structure including a clutch bearing which is axially moveable between contact and noncontact positions;
at least two fluid cylinders each receiving a piston, said pistons being operable to move said clutch bearing between said contact and noncontact positions; and
anti-rotation structure, said anti-rotation structure including pins extending through said clutch beating, said pins preventing rotation of said clutch bearing.

13. A clutch as recited in claim 12, wherein said pins extend through openings in said clutch bearing.

14. A hydraulically actuated clutch mechanism comprising:
an outer housing;
at least one disk for being fixed to a shaft, said disk having a central aperture defining a central axis for said clutch;
a plate member to be selectively brought into contact with said disk to selectively transmit rotation between said plate member and said disk;
actuation structure for selectively bringing said plate member and said disk into contact to transmit rotation between said plate member and said disk, and for selectively bringing said plate member and said disk out of contact, said actuation structure including a clutch bearing moveable axially along said central axis between contact and noncontact positions; and
said actuation structure also including at least two hydraulic cylinders each having a piston, said pistons selectively contacting piston contact surfaces on said clutch bearing to move said clutch bearing between said contact and noncontact positions, said hydraulic cylinders including housings bolted to said outer housing, said hydraulic cylinder housings including a generally planar anti-rotation surface, and said clutch bearing including an anti-rotation surface corresponding to said anti-rotation surfaces of each of said hydraulic cylinder housings.

15. A clutch as recited in claim 14, wherein there are two of said hydraulic cylinder housings and said pistons spaced symmetrically about a central plane of said hydraulic clutch.

16. A clutch as recited in claim 14, wherein said anti-rotation surfaces of said clutch bearing and said hydraulic cylinder housings are in contact with each other as said clutch bearing moves such that said surfaces also guide movement of said clutch bearing.

17. A clutch as recited in claim 14, wherein said piston contact surfaces on said clutch bearing are spaced from said central axis by a first radial distance, and said anti-rotation surfaces are spaced by a second radial distance which is less than said first radial distance.

18. A clutch as recited in claim 17, wherein said anti-rotation surfaces are spaced axially towards said disk and said plate from said piston contact surfaces on said clutch bearing.

19. A clutch as recited in claim 14, wherein said anti-rotation surfaces are spaced axially towards said disk and said plate from said piston contact surfaces on said clutch bearing.

20. A clutch as recited in claim 14, wherein said hydraulic cylinder housings extend into a side wall of said outer housing, and are bolted to said side wall.

21. A hydraulically actuated clutch mechanism comprising:
an outer housing;
at least one disk for being fixed to a shaft, said disk having a central aperture defining a central axis for said clutch;
a plate member to be selectively brought into contact with said disk to selectively transmit rotation between said plate member and said disk;
actuation structure for selectively bringing said plate member and said disk into contact to transmit rotation between said plate member and said disk, and for selectively bringing said plate member and said disk out of contact, said actuation structure including a clutch beating moveable axially along said central axis between contact and noncontact positions; and
said actuation structure also including at least two cylinder bores each receiving a piston, said pistons selectively contacting piston contact surfaces on said clutch bearing to move said clutch bearing between said contact and noncontact positions, said cylinder bores being formed integrally within said outer housing.

22. A clutch as recited in claim 21, wherein said cylinder bores being associated with anti-rotation surfaces corresponding to anti-rotation surfaces on said clutch bearing.

* * * * *